United States Patent [19]

Laine

[11] Patent Number: 5,577,786
[45] Date of Patent: Nov. 26, 1996

[54] COLLAPSIBLE SNOW SCOOP

[75] Inventor: Leo Laine, Rauma, Finland

[73] Assignee: Leo Laine Oy, Rauma, Finland

[21] Appl. No.: 563,700

[22] Filed: Nov. 28, 1995

[30] Foreign Application Priority Data

Nov. 28, 1994 [FI] Finland ................................. 945604

[51] Int. Cl.⁶ .............................. A01B 1/22; E01H 5/02
[52] U.S. Cl. ..................... 294/54.5; 294/53.5; 294/57; 37/285
[58] Field of Search ................... 294/53.5, 54.5, 294/55, 57–59; 16/110 R, 112, 114 R, 115; 37/265, 284, 285; 403/84, 87, 91, 92, 97, 103, 104, 377, 378

[56] References Cited

U.S. PATENT DOCUMENTS

| 2,629,624 | 2/1953 | Nelles | 294/57 |
| 3,154,336 | 10/1964 | Nelson | 294/54.5 X |
| 3,155,413 | 11/1964 | Holombo | 37/265 |
| 3,401,971 | 9/1968 | Cronquist | 294/53.5 |
| 3,583,747 | 6/1971 | Lambert | 294/53.5 X |
| 3,643,356 | 2/1972 | Gohl | 294/54.5 X |
| 4,193,626 | 3/1980 | Vondracek | . |
| 4,424,997 | 1/1984 | Jackson | 294/53.5 |
| 5,048,883 | 9/1991 | Waluk | 294/54.5 |

FOREIGN PATENT DOCUMENTS 127631 7/1973 Norway .

Primary Examiner—Johnny D. Cherry
Attorney, Agent, or Firm—Ladas & Parry

[57] ABSTRACT

The invention relates to a collapsible snow scoop in which the tubular portions (3, 4) of the handle partly slide within each other, and the handle can be folded on the scoop body (1) by means of a locking mechanism (5).

4 Claims, 1 Drawing Sheet

U.S. Patent
Nov. 26, 1996
5,577,786
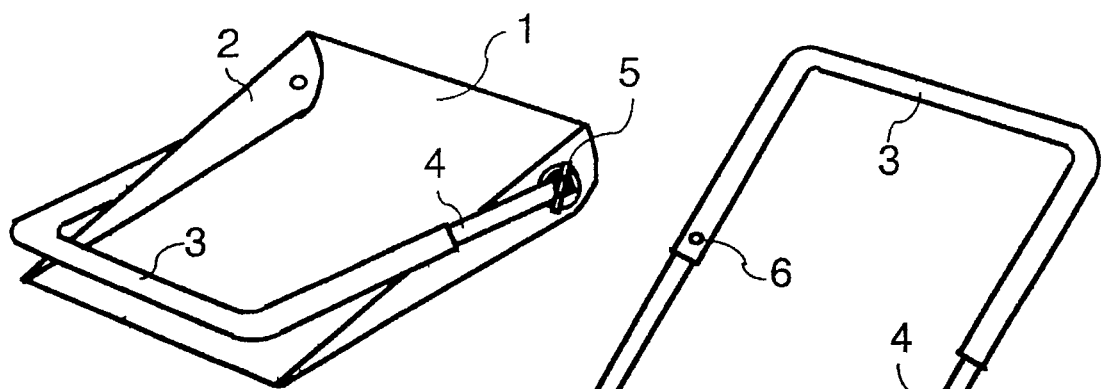
FIG 1
FIG 2
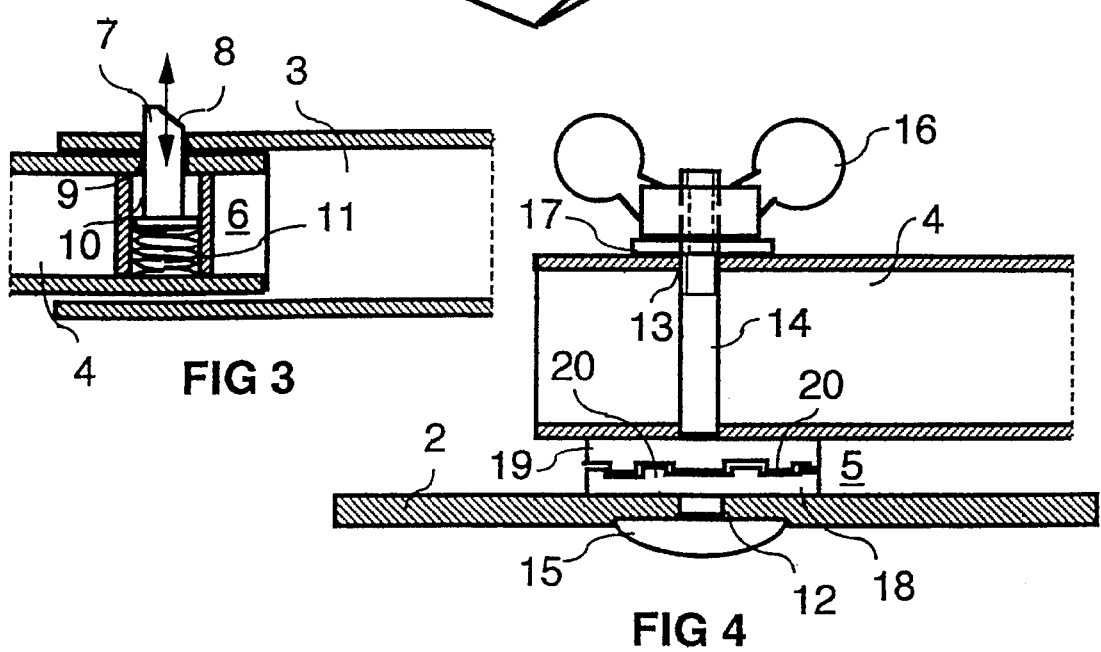
FIG 3
FIG 4

COLLAPSIBLE SNOW SCOOP

The invention relates to a snow scoop which is collapsible to a small size for storage and transportation. Devices for clearing snow, such as snow shovels and snow scoops, are usually provided with fixed handles. Such tools are usually stored leaning against a wall or hanging on a wall, whereby they take up as little space as possible. However, in some cases it is not possible to use snow-clearing tools with fixed handles. In vehicles, for example, there is normally not enough room or suitable places for large snow-clearing tools. Yet, in the event of an unexpected snowstorm, it is vital to have snow-clearing tools in a vehicle that is not provided with snow tires or anti-skid devices.

The object of the present invention is to provide a snow-clearing device which can be stored in a sufficiently small size and which is easy to carry along for instance in a car or some other vehicle.

The invention is based on the idea that a snow scoop can be stored in a space which corresponds to the size of the scoop body. More specifically, the collapsible snow scoop of the present invention is characterized by what is disclosed in the appended claims.

The present invention affords significant advantages. The snow scoop of the invention can be folded up and carried, for example, in the space located on top of the rear wheel in the trunk of a car. The snow scoop of the invention has an extremely simple construction, and it can be folded up without any tools. On account of its simple and solid structure, it can be used for clearing even heavy snow or the like.

In the following, the invention will be described in greater detail with reference to the accompanying drawing.

FIG. 1 shows a collapsible snow scoop of the invention in a position where the handle is folded on the scoop body.

FIG. 2 shows the collapsible snow scoop of the invention in a working position.

FIG. 3 shows a detail of a locking mechanism for the handle of the collapsible snow scoop of the invention.

FIG. 4 shows a locking mechanism for the connection point between the handle and the scoop body.

In FIGS. 1 to 4, number 1 indicates a scoop body, and number 2 its side panels. The handle of the snow scoop is indicated by numbers 3 and 4, and the locking mechanism between the handle and the side panels by number 5. Number 6 indicates a locking mechanism by means of which the second tubular portion 3 and the first tubular portions 4 of the handle can be adjusted with respect to each other in order to shorten the handle for the purpose of storage. Number 7 represents a pin which slides back and forth within the locking mechanism 6. The upper surface of the pin is provided with a bevel 8. The pin 7 is positioned in apertures 9, and it moves within a sleeve 10 by means of a spring 11. The locking mechanism 5 comprises a screw 14 positioned in apertures 12 and 13 in the side panel 2 and the first tubular portion 4, respectively, for securing the handle to the side panel 2. The screw 14 is secured to the side panel 2 by its screw-head 15, whereby the locking mechanism 5 is tightened by means of a butterfly nut 16 and a washer 17, which press the first tubular portions 4 against the first and second locking plates 18, 19, one of the plates being secured to the side panel 2 and the other to the tube 4. The locking plates 19, 18 are provided with projections 20, which interlock with each other, whereby they lock the locking mechanism 5 at a desired angle.

The collapsible snow scoop of the invention is used as follows. The handle, consisting of the tubular portions 3 and 4, is extended to its full length and locked in its position by means of the pin 7, whereby the pin is positioned in aperture 9, locking the tubes 3 and 4 of the handle at their extreme positions. To facilitate the use, the pin 7 is provided with a bevel 8 which allows the tubes 4 and 3 to slide within each other when the pin is pressed down. When the snow scoop is brought into use, the scoop body and the handle portions 3, 4 are positioned at a suitable angle. The locking is effected by unscrewing and screwing the butterfly nut 16 of the locking mechanism 5. Thereafter, the collapsible snow scoop can be used in a conventional manner for clearing snow. When the handle portions 3, 4 are folded on the scoop body 1 and the tubular portions 3, 4 are pushed within each other, the collapsible snow scoop takes up little space and can thus be easily placed in the trunk of a car, e.g. on the side wall or on top of the rear wheel.

It will be obvious to one skilled in the art that the details of the collapsible snow scoop of the invention—e.g. the locking mechanism between the side panels of the scoop body and the handle portion, the arrangement of the tubular portions in the handle, including the locking mechanism—may be modified within the scope of the appended claims.

I claim:

1. A collapsible snow scoop, comprising a scoop body with two side panels, and a handle portion pivotally connected to the side panels of the scoop body, whereby the handle portion is releasably connected to the side panels of the scoop body at a desired angle by means of a locking mechanism, the handle portion comprises two first tubular portions extending from both side panels, and a second, U-shaped tubular portion telescopically connected to said first tubular portions, and the handle portion is foldable on the scoop body.

2. A snow scoop according to claim 1, wherein the locking mechanism between the side panels of the scoop body and the handle portion comprises a first and a second locking plate mounted between each first tubular portion and the respective side panel of the scoop body, and a screw/nut arrangement for pressing the side panel, the locking plates and the first tubular portion of the handle portion together.

3. A snow scoop according to claim 2, wherein the first locking plate is secured to the side panel of the scoop body, and the second locking plate is secured to the first tubular portion of the handle portion, the locking plates being provided with projections which interlock with each other, and the screw/nut arrangement comprises a screw extending through the side panel, the locking plates and the first tubular portion of the handle portion, and a butterfly nut to be screwed on it, whereby the screw-head can be locked to the side panel.

4. A snow scoop according to claim 1, wherein the second, U-shaped tubular portion of the handle portion is releasably connected to the first tubular portions of the handle portion, extending from the side panels of the scoop body, by a locking mechanism comprising a spring-loaded pin in a sleeve provided in the first tubular portions, said pin being arranged to lock the second, U-shaped tubular portion with respect to the first tubular portions by means of apertures provided in said tubular portions.

* * * * *